(No Model.)
P. H. GRIFFIN.
EXPANSIBLE MANDREL.
No. 404,477. Patented June 4, 1889.
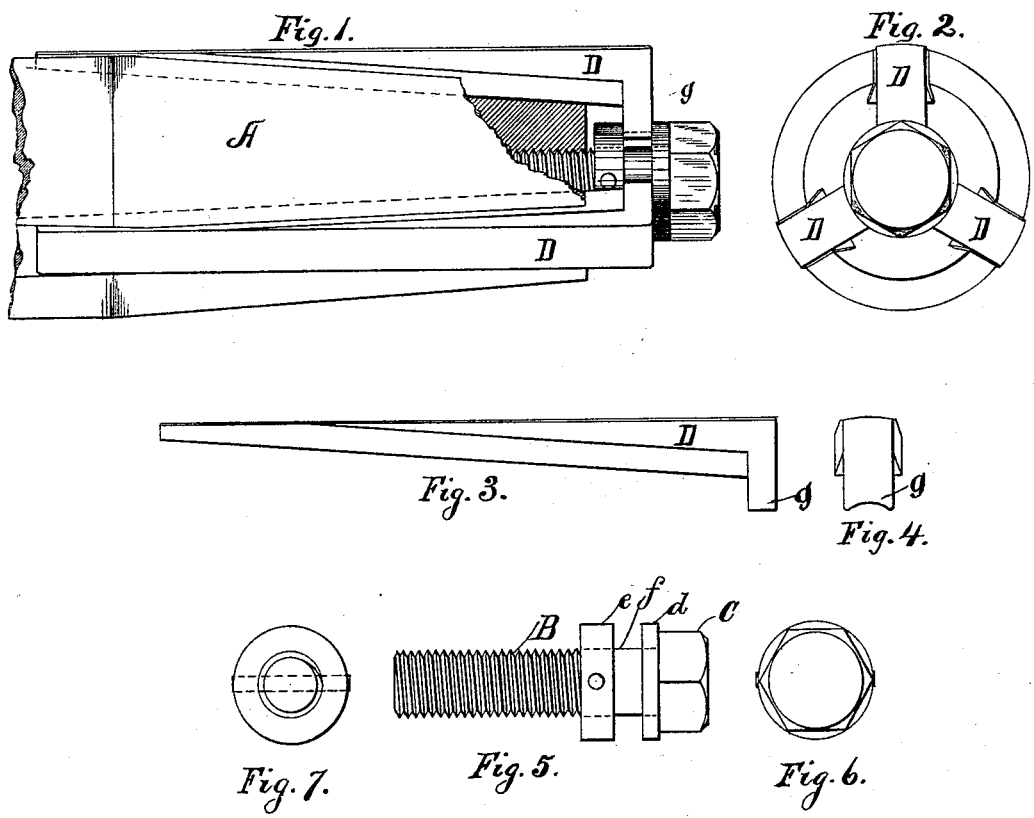

United States Patent Office.

PATRICK HENRY GRIFFIN, OF BUFFALO, NEW YORK.

EXPANSIBLE MANDREL.

SPECIFICATION forming part of Letters Patent No. 404,477, dated June 4, 1889.

Application filed December 5, 1888. Serial No. 292,745. (No model.)

*To all whom it may concern:*

Be it known that I, PATRICK HENRY GRIFFIN, a citizen of the United States, residing at the city of Buffalo, in the county of Erie and State of New York, have invented a new and useful Improvement in Expanding Mandrels, of which the following is a specification.

My invention relates to and is an improvement in expanding-mandrels.

The object of my invention is to improve upon and provide a more convenient and desirable mandrel than those now known and used.

I accomplish the objects of my invention by means of the mechanism hereinafter described, and illustrated in the accompanying drawings, in which—

Figure 1 is a side view of the device, with a portion broken away to better illustrate its construction. Fig. 2 is an end view of the same. Fig. 3 is a side view of one of the wedges, followers, or expanders; and Fig. 4 is an end view of the same. Fig. 5 is a side view of the key, and Fig. 6 is an end view of the same; and Fig. 7 is a top plan view of a ring or washer designed to be secured to the body part of the key, as shown in Fig. 5.

Like letters refer to corresponding parts in each figure of the accompanying drawings.

A represents a tapering or cone-shaped arbor having three longitudinal grooves or channels. The channels are located equidistant from each other and upon the periphery of the arbor, and are each a dovetail in cross-section, and are designed for the reception of wedges or jaws, which are also of dovetail shape in cross-section, as illustrated in Figs. 3 and 4. The arbor is also provided with a screw-threaded aperture or female screw in its end, and designed for the reception of the screw-threaded spindle B, as shown in Fig. 1.

B is the spindle which operates the expanding mechanism of the mandrel, and consists of a screw-threaded bolt having an angular head C, with a circular base portion $d$, and provided with a circular nut or washer $e$, secured to the bolt a short distance from its head, thereby forming a neck portion $f$ upon the bolt, and located between $e$ and the circular base of the head and designed for the reception of toe $g$ upon jaw D.

D D and D are the three jaws, followers, or expanders operating in the grooves of the arbor. (Shown by dotted lines in Fig. 1.) These are each of the construction shown in Figs. 3 and 4, and like the grooves in the arbor. A cross-section of either at any point in their length would have the outline of a dovetail. The head of each wedge or jaw is provided with a toe $g$, Fig. 4, designed to enter the groove and rest upon the neck $f$ of spindle B, as shown in Figs. 1 and 2. By this arrangement the jaws are kept constantly in their proper place, and are completely controlled by the spindle B, and follow it either forward or back without interfering with the revolutions thereof, and the head of the key is outside of the work and handy of access.

The operation of the device is obvious. Revolving the spindle one way (to the right) forces the jaws forward and expands the device, and a contrary revolution withdraws the jaws and contracts the device.

It will be observed that the device hereinbefore described differs from expanding mandrels as heretofore constructed in the following particulars, to wit: In place of a notch in the sliding jaws, wherewith the collar of the revolving nut engages to move said jaws, I provide my jaws with a projection or toe engaging the circular base of the head of the spindle and a circular nut $e$—an arrangement not found in such expansible mandrels. This is an essential feature of my device when used in connection with grinding and other machinery where emery-wheels are employed.

Another difference in the construction of my expansible mandrel is the tapering arbor A, having parallel grooves or channels, which channels are of even depth throughout, thereby affording a bearing for the sliding jaws throughout nearly their entire length—a construction not to be found in expansible mandrels as heretofore constructed.

What I claim, therefore, and desire to secure by Letters Patent of the United States, is—

1. In expansible mandrels, the combination, with a tapering arbor A, provided with an internally-screw-threaded central aperture and with parallel dovetail longitudinal grooves at the periphery, of the wedge-shaped jaws D, having parallel toes $g$ at their heads, and the spindle B, having the head C and circular nut $e$, the whole being constructed to operate substantially as and for the purpose stated.

2. In expansible mandrels, the combination, with a tapering arbor having dovetailed longitudinal grooves at its periphery, of taper jaws having toes at their heads, a revolving screw-threaded spindle engaging said arbor, provided with a head having a circular base, and a removable nut upon said spindle, said toes engaging the neck $f$ in said spindle, substantially as and for the object stated.

P. HENRY GRIFFIN.

Witnesses:
S. H. JONES,
SILAS J. DOUGLASS.